(12) United States Patent
Volto et al.

(10) Patent No.: US 8,175,856 B2
(45) Date of Patent: May 8, 2012

(54) METHOD FOR SIMULATING THE GAUGING OF A LIQUID TANK

(75) Inventors: Eric Volto, Suresnes (FR); Antoine Rohaut, Vieux Moulin (FR); Francçois Francini, Compiegne (FR); Paul Daniel Reuther, Oxford, MI (US)

(73) Assignee: Inergy Automotive Systems Research (S.A.), Brussels (BE)

( * ) Notice: Subject to any disclaimer, the term of this patent is extended or adjusted under 35 U.S.C. 154(b) by 261 days.

(21) Appl. No.: 12/490,497

(22) Filed: Jun. 24, 2009

(65) Prior Publication Data

US 2010/0070061 A1 Mar. 18, 2010

Related U.S. Application Data

(60) Provisional application No. 61/122,433, filed on Dec. 15, 2008.

(30) Foreign Application Priority Data

Jun. 24, 2008 (FR) ...................................... 0854184

(51) Int. Cl.
*G06F 17/10* (2006.01)
(52) U.S. Cl. ................................. 703/2; 703/1
(58) Field of Classification Search .................. 703/1, 2, 703/9; 700/98; 702/55; 73/290 R
See application file for complete search history.

(56) References Cited

U.S. PATENT DOCUMENTS

| | | | | |
|---|---|---|---|---|
| 5,133,212 A | * | 7/1992 | Grills et al. | 73/296 |
| 5,138,559 A | * | 8/1992 | Kuehl et al. | 702/55 |
| 5,383,359 A | * | 1/1995 | Challoner et al. | 73/290 R |
| 6,012,020 A | * | 1/2000 | Gardell et al. | 702/50 |
| 7,103,460 B1 | * | 9/2006 | Breed | 701/29 |
| 7,130,780 B2 | * | 10/2006 | Yankielun et al. | 703/6 |
| 7,658,105 B2 | * | 2/2010 | Holz | 73/320 |
| 2010/0076734 A1 | * | 3/2010 | Volto et al. | 703/2 |

FOREIGN PATENT DOCUMENTS

| | | |
|---|---|---|
| EP | 0595389 A1 | 5/1994 |
| FR | 1100151 A | 9/1955 |
| JP | 60253919 A | 12/1985 |

OTHER PUBLICATIONS

Chakravarthy et al, S. Noncontact Level Sensing Technique Using Computer Vision, IEEE Transactions on Instrumentation and Measurement, vol. 51, No. 2, Apr. 2002, pp. 353-361.*

Han et al, Y. High Precision Intelligent Apparatus Driven by a Step Motor for Measuring Liquid Level, Proceedings of the IEEE International Symposium on Industrial Electronics, 1992, pp. 172-176.*

Weib et al, M. A Highly Accurate Multi-Target Microwave Ranging System for Measuring Liquid Levels in Tanks, 27th European Microwave Conference, 1997, pp. 1103-1112.*

* cited by examiner

*Primary Examiner* — Russell Frejd
(74) *Attorney, Agent, or Firm* — Oblon, Spivak, McClelland, Maier & Neustadt, L.L.P.

(57) ABSTRACT

A method for generating a gauging curve for a hollow body containing a liquid. The curve including a set of measurement points for a liquid level inside the hollow body, and the curve approaching an optimum gauging curve. The method includes, for several different partial filling volumes of the hollow body, calculating an average center of mass of a corresponding free liquid surface for various inclinations of the hollow body, in terms of both amplitude and direction. The method further includes generating a gauging curve that passes substantially through each of the average centers of mass.

9 Claims, 11 Drawing Sheets

METHOD FOR SIMULATING THE GAUGING OF A LIQUID TANK

CROSS-REFERENCE TO RELATED APPLICATIONS

This nonprovisional application claims priority benefit to French Application No. 0854184 filed Jun. 24, 2008 and to U.S. provisional Application No. 61/122,433 filed on Dec. 15, 2008, these applications being herein incorporated by reference in their entirety for all purposes.

BACKGROUND OF THE INVENTION

I. Field of the Invention

The present invention relates to a method for simulating the gauging of a liquid tank, in particular a liquid fuel tank of a vehicle, preferably by means of a data processing device containing a virtual model of the tank comprising an internal volume, a wall that defines said internal volume, and a liquid extraction point in this internal volume.

The expression "liquid tank" is understood to mean any tank for a liquid material of any nature. The invention preferably applies to those that are mounted on motorized vehicles such as motor vehicles, such as fuel tanks or tanks for pollution-control additives (for example, urea, which is used to reduce the $NO_x$ in the exhaust gases). It applies more particularly to liquid fuel tanks.

Such tanks may be manufactured by any known technique before being equipped with a liquid gauge. They may, for example, be obtained by pressing and/or welding steel sheets, by extrusion-blow moulding of parisons made of plastic of various types, by pouring or injecting various materials into a mould or by any other technique suitable for the manufacture of closed hollow objects capable of containing liquids. The invention is particularly suitable for the simulation of plastic tanks, more particularly those obtained by the extrusion-blow moulding technique.

The term "gauge" is understood to mean any gauge for measuring the volume of liquid, based on the observation of the level of the free surface of the liquid contained in a tank such as a float gauge, a gauge based on measuring the variation of an electrical property of the gauge immersed in the liquid or a gauge that combines a float system and an electrical device that is coupled thereto, or any other type of gauge. The gauge conforming to the invention may be in various forms such as a rectilinear gauge, circular gauge, or gauge of any shape.

The terms "gauging curve" intend to designate the set of measurement points for the liquid level inside the hollow body. According to the invention, the real gauging curve is established based on a simulated (calculated) curve which approached the ideal gauging curve as will be explained below.

The term "vehicle" is understood to mean any mobile machine that can be moved in any direction that varies in the course of the movement along a slope that may itself also vary with the movement and more particularly those that can be moved over a horizontal or sloped surface.

The expression "data processing device" is understood to mean any programmable device that makes it possible to process a data set, in particular in the form of computer data files, according to a set of logic instructions, or software. In particular, it is understood to mean, in this way, any programmable electronic computer.

The expression "electronic medium" is understood to mean any data storage device that can be read by such a data processing device such as, for example, an optical memory device such as a CD-Rom, DVD, or others, a magnetic memory device such as a hard disk, magnetic tape, floppy disk, or others, or an electronic memory device such as a memory chip, flash memory or others.

The expression "virtual model" is understood to mean any detailed description in the form of computer data files, in particular computer data files capable of being processed by computer-aided design (CAD) software.

II. Description of Related Art

In the production of liquid tanks, one of the greatest obstacles is that of ensuring the gauging accuracy. This problem is particularly acute in the field of liquid fuel tanks for vehicles, since the design constraints and especially space constraints for these tanks often impose very complex shapes and present particular gauging problems. Moreover, in use, such tanks are often subjected to inclinations and/or accelerations that cause inclinations of the liquid surfaces and thus errors in gauging may be considerable if the location, shape and orientation of the liquid gauge are not optimal.

For a long time, the parameters for the location, shape and orientation of gauges were determined by trying several different configurations until a configuration meeting predetermined specifications was found. However this is a relatively ineffective method, requiring considerable means and subject to error. In order to facilitate the configuration of the gauges, an iterative simulation method was therefore proposed in European Patent EP 0 595 389, making it possible to design more accurate gauges, in particular with CAD means.

However, this prior art method also comprises drawbacks. In particular, the iterative nature of the method requires a considerable computation time.

BRIEF SUMMARY OF THE INVENTION

One object of the present invention is therefore that of providing a gauging simulation method that makes it possible to concieve (design), more rapidly, a gauge that is not very sensitive to the inclination of the surface of the liquid in the tank.

The idea behind the present invention derives from the fact that, for each filling level, the center of mass of the free surface (i.e. its center of gravity) of liquid in the tank is normally the point least sensitive to the inclinations of the free liquid surface. The present invention therefore achieves the aforementioned object via a method for simulating the gauging of a hollow body intended to contain a liquid and that comprises the following steps:

for several different partial filling volumes of said hollow body, calculating the center of mass of the corresponding free liquid surface; and generating a gauging curve that passes substantially through each of said centers of mass.

In this way, a gauging curve that approaches the optimum gauging curve is successfully generated in a simple and rapid manner.

With hollow bodies (tanks) of complex shape, the center of mass of the free liquid surface may move significantly depending on the inclination of this free surface. In order to better approach the optimum gauging curve, it is therefore normally preferable to repeat the operation of calculating the center of mass for a given partial filling volume, with various inclinations of the tank (in terms of both amplitude and direction) and to average the centers of mass. In other words: it is preferable, for each filling level of the tank, to calculate the average of the centers of mass obtained by varying the angle of inclination and the angle of orientation of this tank.

Within this variant of the invention:

the expression "angle of inclination" or of slope, is understood to mean the angle θ that a reference plane of the tank makes with the horizontal; in an orthogonal coordinate system it is possible to define 2 orthogonal axes X and Y included in the reference plane (for example: the X-axis going from the front to the rear of the vehicle and the Y-axis going from left to the right of the vehicle) and a Z-axis orthogonal to this plane; the angle θ is then the angle through which the Z-axis has swung in the inclined (sloped) position of the tank; and the expression "angle of orientation" or of direction, is understood to mean the angle α about which the inclination is applied; in the orthogonal coordinate system defined above, this is in fact the angle that the perpendicular to the axis about which the reference plane has swung makes with the X-axis (or the angle that the axis about which the reference plane has swung makes with the Y-axis).

FIG. 11 appended to the present document schematically illustrates these definitions.

In the field of vehicles, and in particular motor vehicles, saddle-shaped liquid fuel tanks ("saddle tanks") or U-shaped (inverted saddle) liquid fuel tanks are often found, which are normally intended to be placed on top of a transmission tunnel, and which comprise two lower pockets, each with a liquid extraction point. These tanks have, due to their shape, particular problems for simulating the gauging. Preferably, in the simulation method for gauging such a(n) (inverted) saddle tank, the gauging curve may be in the shape of an inverted Y that forks at a predetermined point for the transfer of liquid between the two lower pockets. Preferably, said gauging curve may then also comprise two transition points each located mid-way between said liquid transfer point and the highest center of mass calculated for each pocket. This is explained in greater detail in the FIGS. 8 to 10 appended to the present document and in the text which relates thereto.

In one preferred variant of the invention, the hollow body (tank) comprises an extraction module (i.e. generally a pump/gauge module, which may include a filter and/or a pressure regulator) for withdrawing liquid via an extraction point. In this variant, in order to be able to gauge the tank substantially until it is completely drained, the gauging curve preferably begins with at least one starting point close to or coincident with said liquid extraction point, the latter variant being preferred. To avoid an abrupt transition of the gauging curve between this starting point and the first of said calculated centers of mass, the method may preferably also comprise a step of smoothing the gauging curve over an initial section comprising the starting point and the point of the centers of mass that is closest thereto. This smoothing may, for example, be carried out by minimizing the distance between the ideal gauging point and the real one, applying a curve according to a 1/x function.

Normally, the fuel tanks for motor vehicles comprise a pump/gauge module, with a perimeter that is usually open towards the top so as to serve as a fuel reserve, in which a fuel extraction pump connected to said liquid extraction point is located, and outside of which the fuel gauge is mobile. The tank for which the gauging is simulated according to the method of the invention may comprise such a module, the liquid extraction point of which may be located inside of this perimeter and therefore, may not normally be directly accessible by the gauge. Advantageously in this case, said first point of the gauging curve may be the point of the perimeter of said gauging module closest to the liquid extraction point.

Often, the gauge takes the form of a float arm pivotably attached to a module as described above about an axis that passes through said module. The gauge will therefore follow an arc about an axis of rotation that passes through the gauging module. In this case, it is normally preferable for the simulation method of the invention to comprise, in addition, a step of approximating said gauging curve by at least one arc centered on the aforementioned axis (see appended FIG. 1). This may be done again by minimizing the distance between the ideal gauging point and the real one, for different gauges geometries and locations, until a minimum error is found.

Normally, and especially in tanks of complex shape, the filling volume is not linear with respect to the gauged level. Moreover, most gauges do not measure the height of liquid directly but rather an angle expressed as resistance (that varies as a function of the position of the float arm). Preferably, the simulation method of the invention may therefore also comprise a step of calculating a calibration curve for the couple tank/gauge that gives the value of the height of liquid as a function of the resistance (h=f(R), which is characteristic of a given gauge), and also a step of calculating the volume of liquid associated with a given height (V=f(h), which is characteristic of a given tank geometry).

Preferably, in the method according to the invention, several different gauges are calibrated and the gauge for which the calibration curve is such that it causes the smallest gauging error is chosen. It is then arranged for the movement of the gauge to match as best as possible the curve of least error.

Relative to this calibration curve, an inclination of the free surface of the liquid will normally cause a gauging error. Advantageously, the simulation method of the invention may also comprise a step of calculating at least one gauging error relative to said calibration curve for a sectioning plane that is inclined relative to the sectioning planes of the calibration curve.

In an actual tank, and in particular in a tank made of a synthetic material, the ageing of the material of the tank and the consequent deformation of the tank may also be a source of gauging errors. Given that it is possible to simulate the deformation of the tank due to ageing of the material, the method according to the invention may advantageously comprise the following steps:

simulating a deformation of the tank for at least one ageing period; and calculating at least one gauging error relative to said calibration curve for this ageing period.

The design of a tank with a gauge is often subjected to specifications comprising, for the gauge, at least one maximum permissible gauging error. Preferably, the method according to the invention may therefore also comprise a step of validating the gauge that consists in verifying that no calculated gauging error exceeds a predetermined maximum gauging error.

The present invention also relates to a method of manufacturing a liquid tank, in particular a liquid fuel tank for a vehicle, based on a virtual model of the tank, characterized in that parameters for the location, shape and orientation of the gauge are determined by the simulation method according to the invention.

The present invention also relates to a data processing device programmed to carry out said simulation method, to software for carrying out said simulation method and to an electronic medium that can be read by a data processing device and that comprises software enabling said data processing device to carry out said simulation method.

BRIEF DESCRIPTION OF THE DRAWINGS

Details regarding the invention are described below with reference to the drawings.

DETAILED DESCRIPTION OF THE INVENTION

Figure 1:
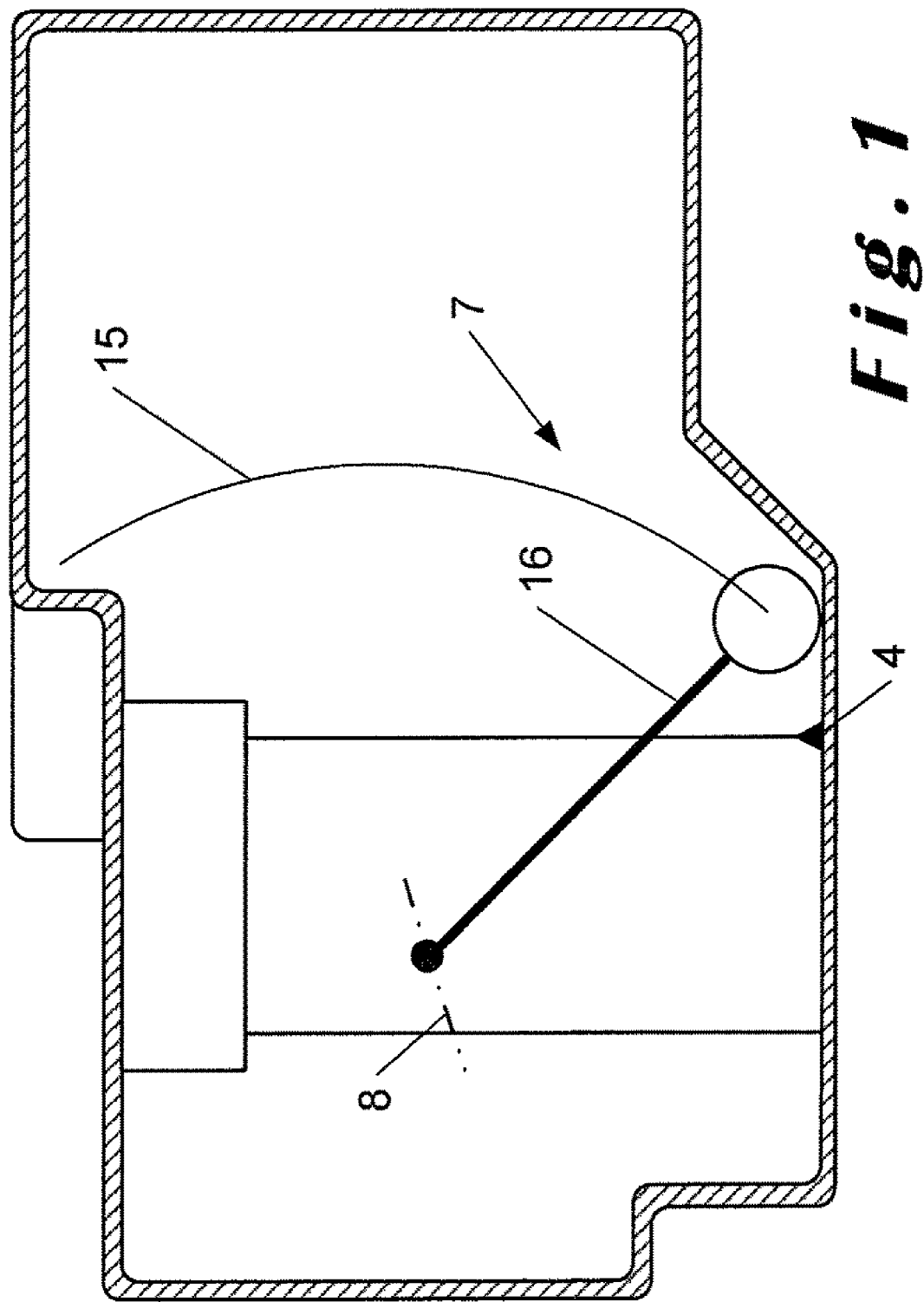
FIG. 1 presents a cross-sectional view of a liquid tank to be simulated according to one embodiment of the method of the invention.

A typical example of a liquid fuel tank 1 of a motor vehicle is represented schematically in FIG. 1. This tank 1 comprises a wall 2 that defines an internal volume 3 and, in this internal volume 3, a liquid extraction point 4 and a pump/gauge module 5 comprising a perimeter 6 in contact with said wall 2, a liquid extraction pump (not shown, but located within said perimeter 6) and a gauge 7 having a float arm that pivots about an axis 8.

During the design of such a tank 1, it is customary to use data processing devices programmed with computer-aided design (CAD) software. With such means and on the basis of various technical constraints linked, for example, to the geometry and the space available, to the mechanical strength, or to the method of manufacturing the tank 1, a designer may create a virtual model, in the form of computer files that describe the tank 1, which may be represented graphically, for example on a screen or else on paper, and which may also be used to prepare and/or to direct production tools.

The simulation method according to one preferred embodiment of the invention is carried out by a computer programmed with C++ language software for the calculations and Java language software for the graphical representation, on the basis of computer files containing such a virtual model of the tank 1, produced with conventional CAD means.

Figure 2:
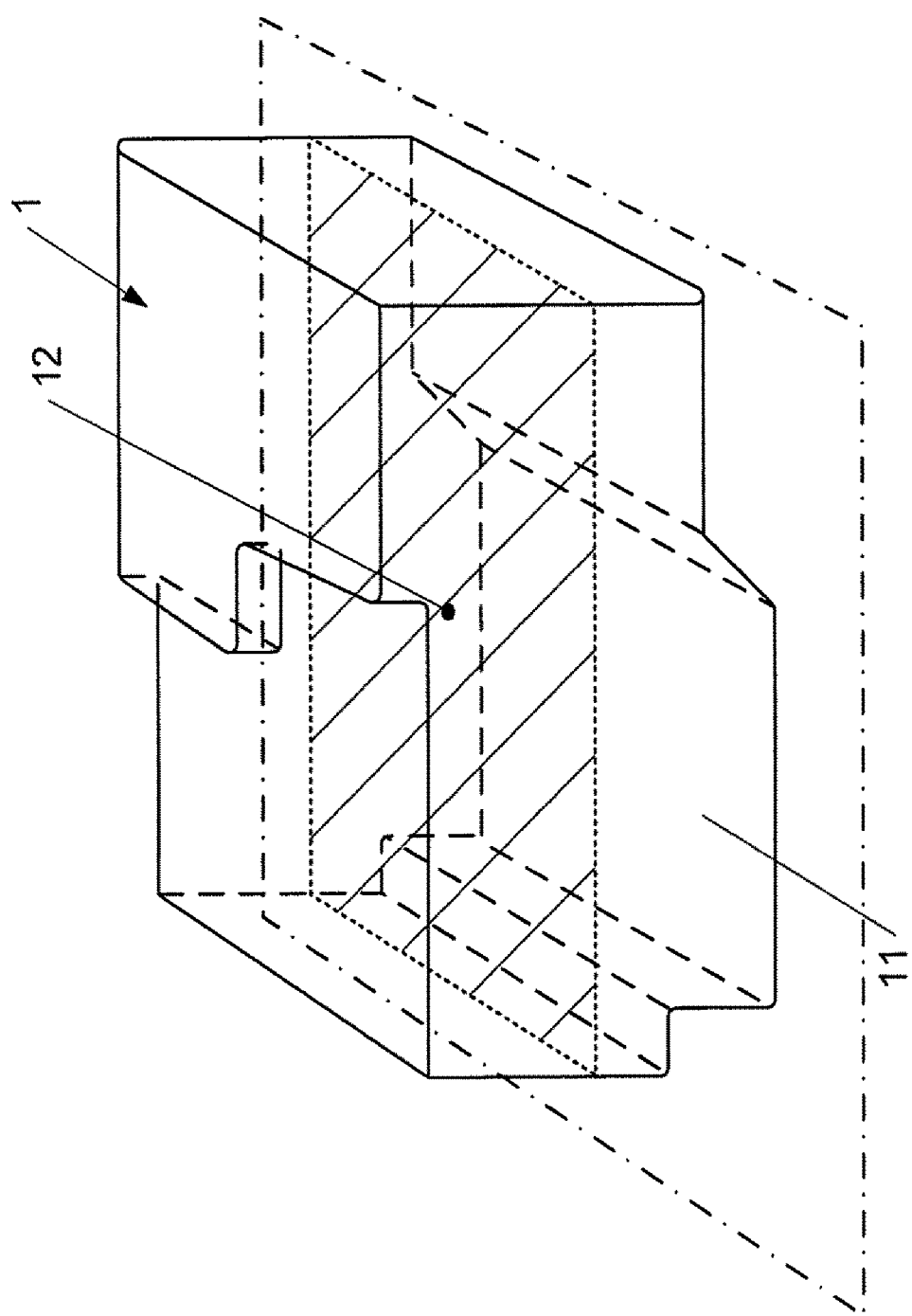
FIG. 2 presents a schematic perspective view of a virtual model of the tank from FIG. 1 and of a sectioning plane.

Seen schematically in FIG. 2 is such a virtual model of the tank 1 partially filled with liquid so as to have a free surface 10 that lies within a sectioning plane 9.

In a first step, the center of mass 12 of the free surface 10 is calculated, which corresponds to the average position of all of the points of the surface 10. This center centre of mass 12 is in fact close to the point for which, for a same volume of liquid in the tank 1, an inclination of the free liquid surface will result in a minimum variation of the gauge level.

Figure 3:
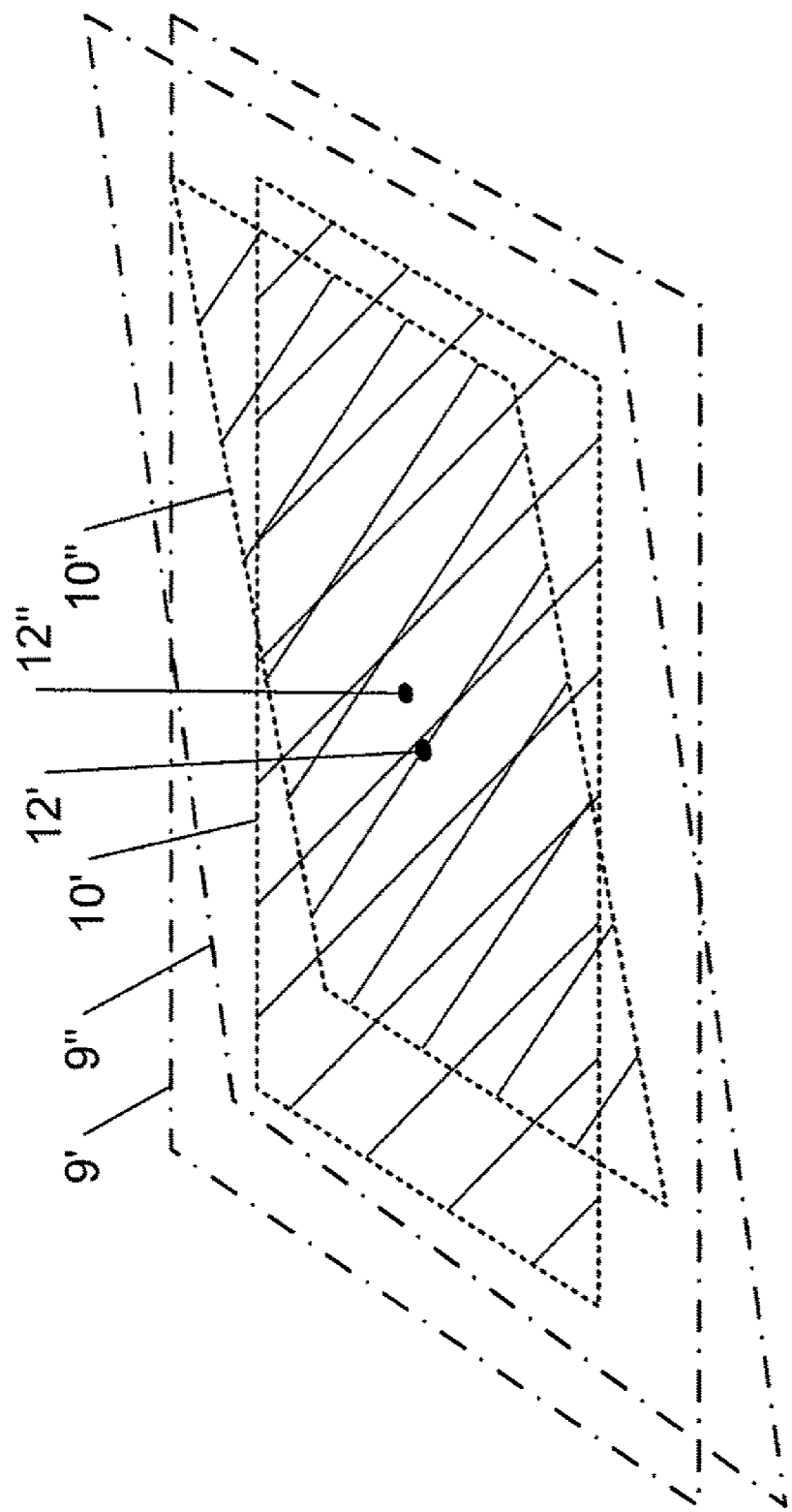
FIG. 3 presents a schematic perspective view of a virtual model of the tank from FIG. 1 and of several sectioning planes.

In order to get even closer to this point of minimum variation, especially for tanks of highly irregular shape, in which the center of mass of the free liquid surface may vary substantially with the inclination of this surface, it is preferable to repeat this step with several different inclinations: see, for example, FIG. 3. It is then possible to calculate the average position of all of the centers of mass.

Figure 4:
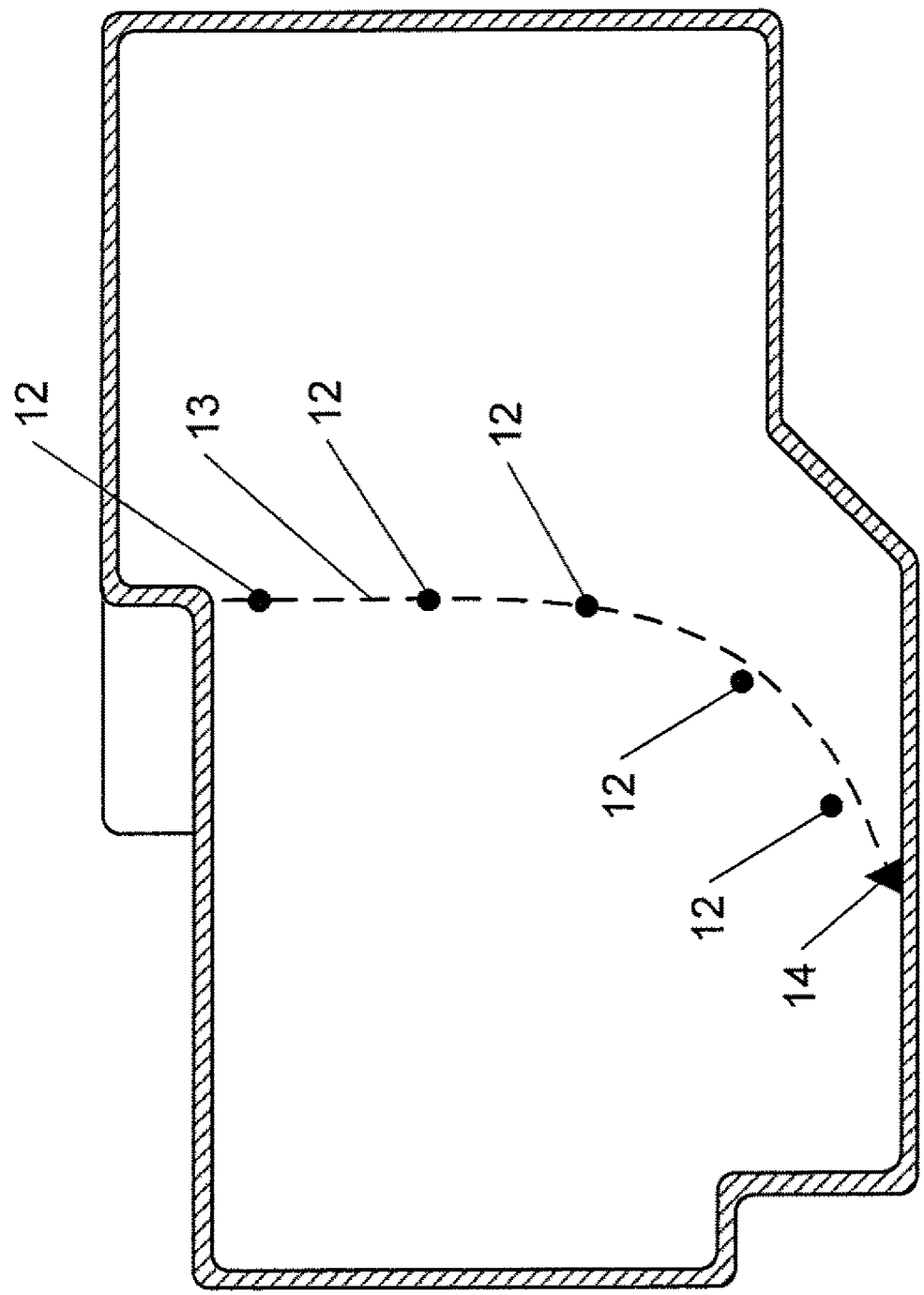
FIG. 4 presents a schematic view of a virtual model of the tank from FIG. 1 and a gauging curve generated according to one embodiment of the method of the invention.

By repeating the operation with various filling levels corresponding to various free surfaces 10, it is possible to calculate a set of centers of mass 12 as illustrated in FIG. 4. In a subsequent step, a gauging curve 13 is then generated that passes substantially through each of the centers of mass 12.

Figure 5:
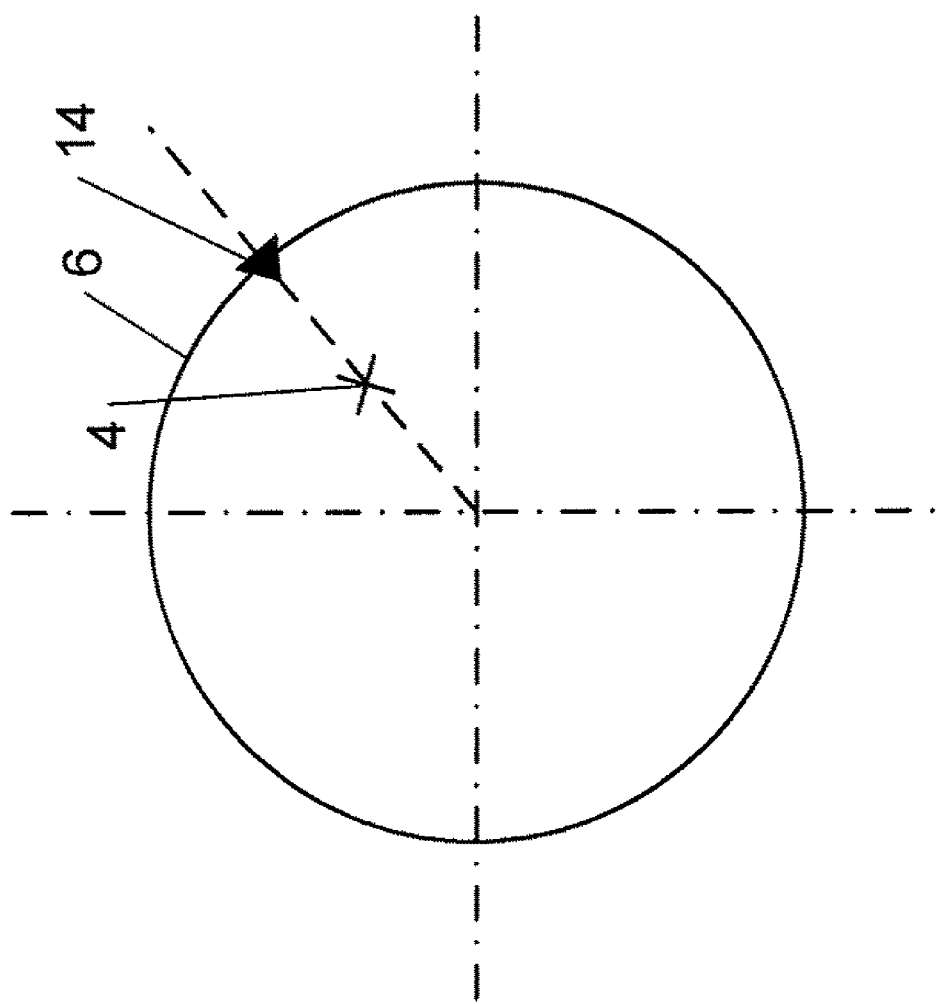
FIG. 5 presents a schematic cross-sectional view of a gauging module with a liquid extraction point on the inside and the starting point of a gauging curve generated according to another embodiment of the method of the invention.

The gauging curve 13 begins with a starting point 14, which, in the embodiment illustrated in FIG. 4, coincides with the liquid extraction point 4. However, when the liquid extraction point 4 is inside the module 5, and therefore out of reach of the gauge 7, it is possible to choose, as the starting point 14 of the gauging curve 13, the point of the perimeter 6 closest to said liquid extraction point 4, as illustrated in FIG. 5.

Said starting point 14 may be moved substantially laterally with respect to the centres of mass 12, as illustrated in FIG. 4. In order to prevent the gauging curve 13 from therefore having too abrupt a transition with respect to said starting point 14, it is possible to subject this gauging curve 13 to a smoothing step (as explained above).

In this preferred embodiment, the smoothing is carried out by making the gauging curve 13 converge from a given point (for example, the center of gravity of the tank 1), towards the starting point 14.

For this, the position of the points of the gauging curve 13 corresponding to the n−1 centers of mass closest to the starting point is moved along each of the two perpendicular coordinate axes that correspond, for example, to a horizontal reference plane, according to an equation such as this:

$$X\text{corr}[i] = X0 + 4(n/(1+n) - i/(1+i)(X[i]-X0)^{3/4}$$

when $X[i] \geq X0$; and $$X\text{corr}[i] = X0 + 4(n/(1+n) - i/(1+i)(X[i]-X0)^{3/4}$$

when $X[i] < X\lim$.

in which X0 is the coordinate of the starting point 14 on this axis, i is the position of each center of mass 12 (from i=1 for the furthest center of mass to i=n−1 for the center of mass closest to the starting point 14), X[i] is the coordinate of this center of mass 12, and Xcorr[i] is the corrected coordinate of the curve 13 in this axis level with this center of mass 12.

The resulting gauging curve 13, although close to the optimum, is not however necessarily an actual curve. In particular, if the intention is to use a gauge 7 having a float arm 16, such as that illustrated in FIG. 1, the actual gauging curve will have to follow an arc 15 centered on the axis 8. In the subsequent step for the method, the gauging curve 13 will therefore be approximated by an arc 15 centered on an axis 8 that passes through the module 5. This approximation, which may be carried out by any method (such as, for example, the least squares method) makes it possible to determine parameters for the location, shape and orientation of the gauge 7, especially the position and orientation of the axis 8 and the position and length of the float arm 16 relative to the axis 8.

Figure 6:
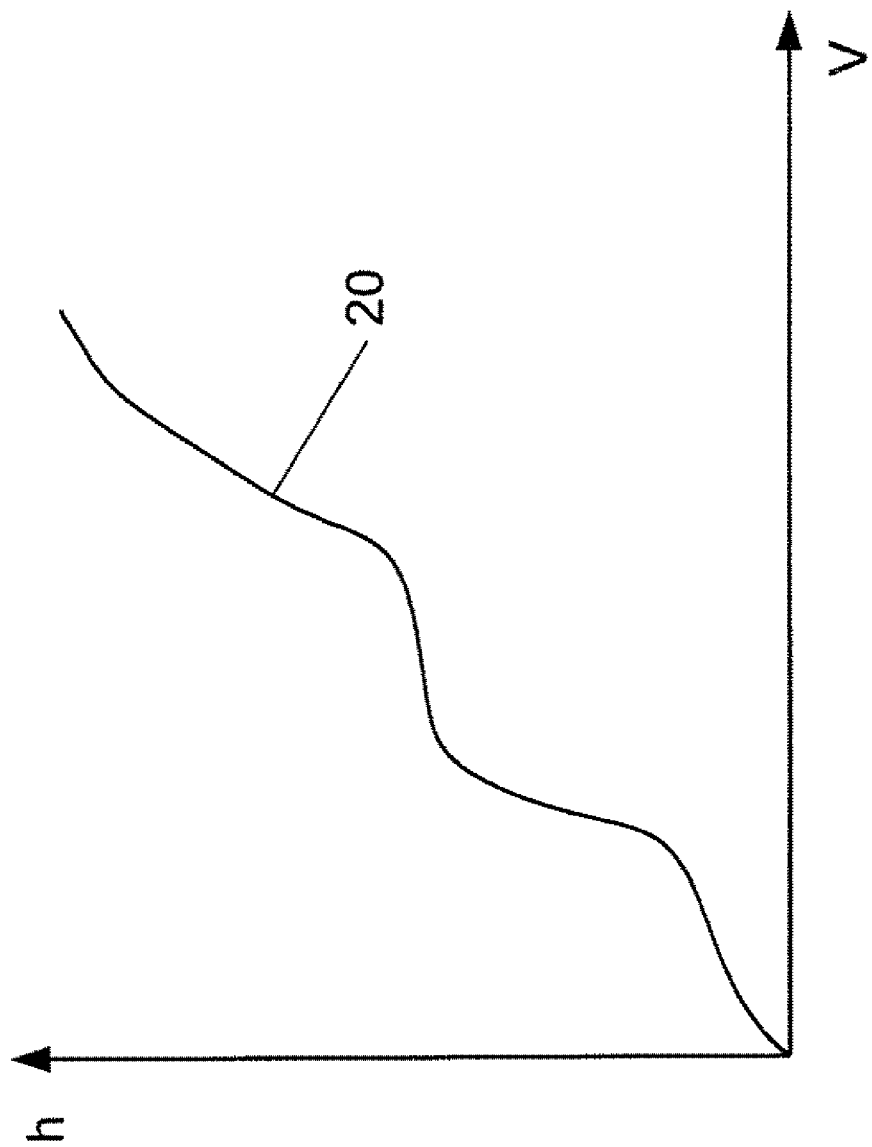
FIG. 6 presents a calibration curve generated according to one embodiment of the invention.

On the basis of these parameters, it is then possible to generate a curve 20 characteristic of the geometry of the tank, such as that illustrated in FIG. 6, presenting the filling volume V as a function of the level h of the gauge 7 for a reference orientation of the free liquid surfaces, which normally corresponds to a horizontal position of the vehicle and zero acceleration.

To validate the gauge 7, it is determined that the gauging error relative to this calibration curve 20 does not exceed a maximum permissible error for one or more different inclinations relative to this reference orientation, and for one or more filling volumes.

If the gauge 7 is not validated in this step, it is then possible to proceed to an iteration in order to optimize the design of the gauge 7 and/or the tank 1 before manufacturing the tank 1 by means known to a person skilled in the art such as, for example, extrusion-blow moulding of synthetic and, in particular, thermoplastic material.

Figure 7:
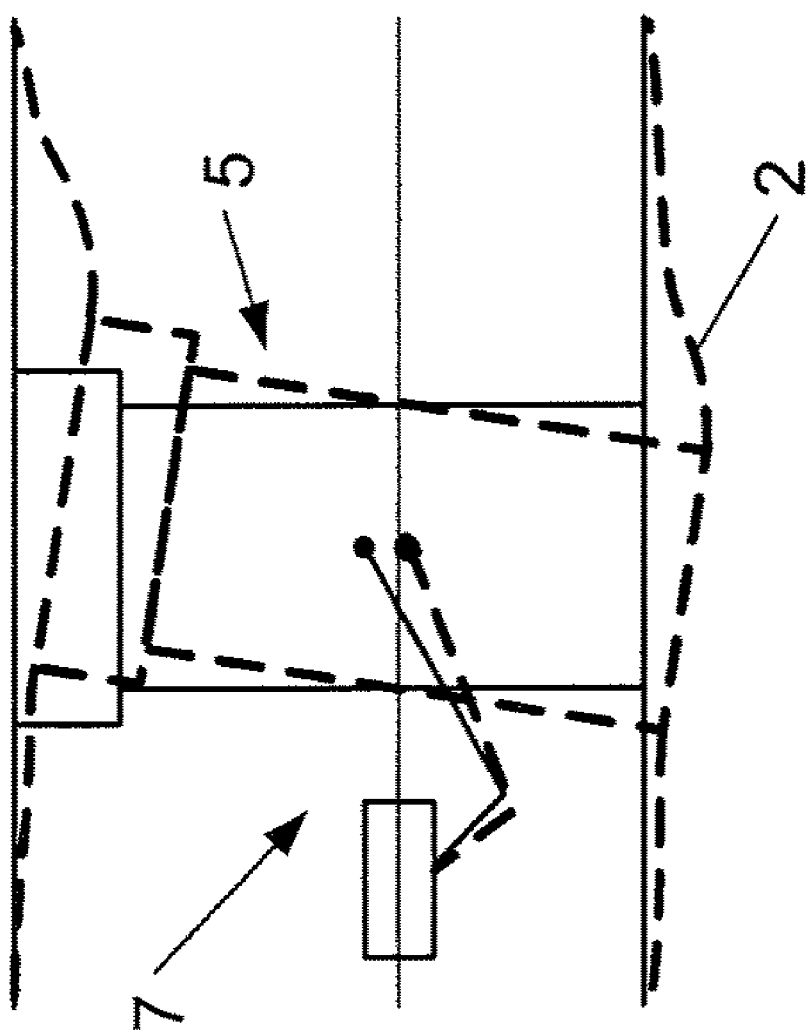
FIG. 7 presents a schematic view of the effects of ageing of the tank from FIG. 1.

Apart from the inclination of the free surface of liquid in the tank 1, another possible source of gauging errors is the ageing of the material of the tank 1. In particular in the case of a tank made from a synthetic material, this ageing, which may be accelerated by an aggressive environment, results in substantial deformations of the tank that may distort the gauge 7, in particular when the ageing causes a partial indentation of the wall 2 level with the gauging module 5, as illustrated in FIG. 7. However, the deformations due to ageing follow laws known to a person skilled in the art, so that it is already possible to simulate the ageing of the tank 1 in the virtual model. To validate the tank 1 with the gauge 7 according to this embodiment of the simulation method of the invention, the gauging error is therefore also calculated at one or more ageing intervals (i.e. the value calculated taking the deformation of the tank into account is compared with the value obtained if no deformation has occurred), and it is confirmed that this gauging error does not exceed a maximum value.

Figure 8:
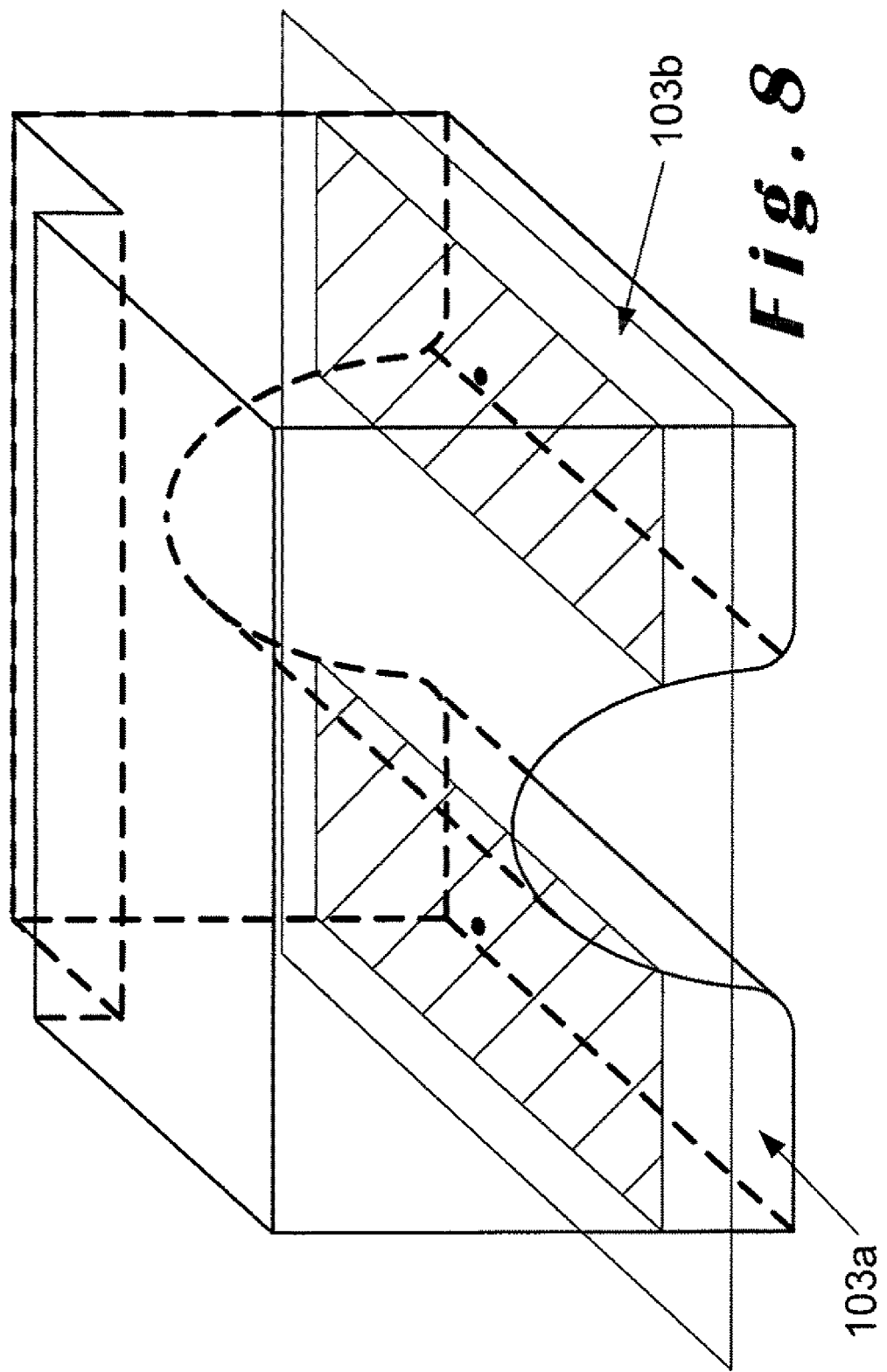
FIG. 8 presents a schematic perspective view of a virtual model of a liquid saddle tank, the gauging of which is to be simulated according to another embodiment of the method of the invention.
Figure 9:
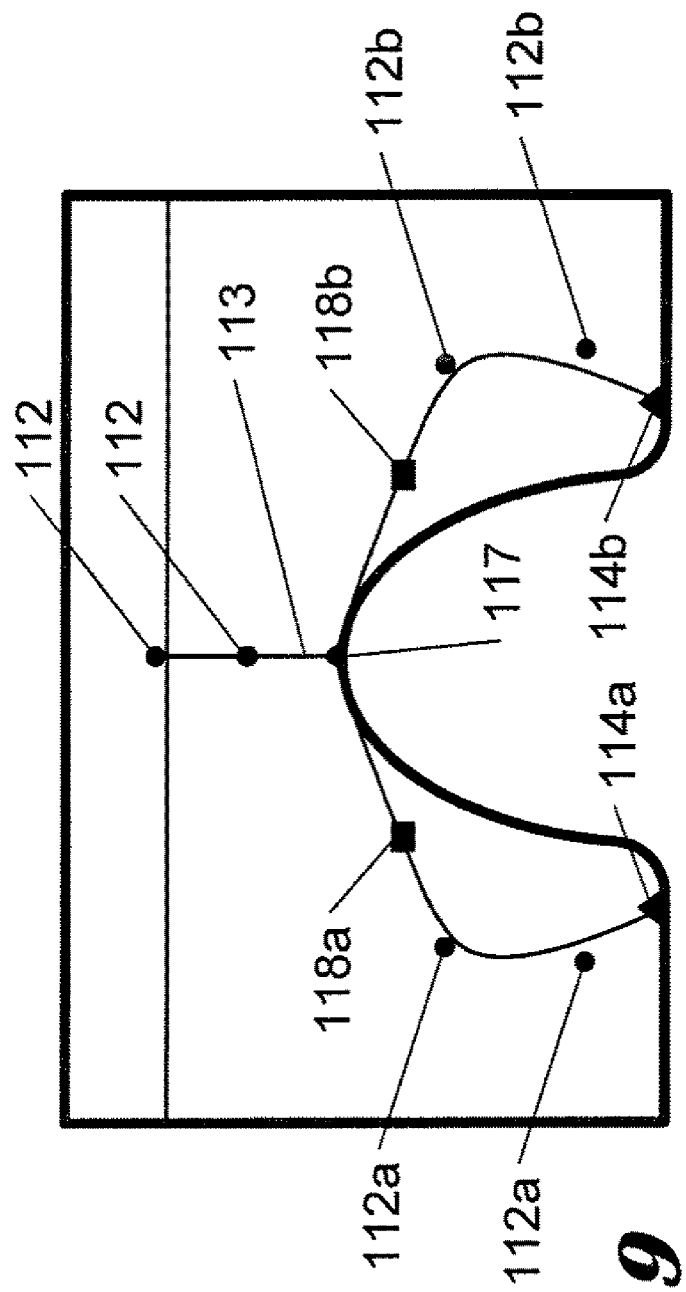
FIG. 9 presents a schematic view of a section through the tank from FIG. 8 and a theoretical gauging curve derived from the simulation.

FIGS. 8 and 9 illustrate a saddle tank, to which a method according to an alternative embodiment of the invention is applied. The tank comprises two lower pockets 103a and 103b and, in each of these two lower pockets, a liquid extraction point 104a, 104b.

The tank also comprises a predetermined point 117 for transfer of liquid between the two pockets 103a and 103b. In the method according to the embodiment illustrated, the pockets 103a and 103b are treated separately underneath said liquid transfer point 117, so as to obtain separate centers of mass 112a, 112b for the free surfaces of the pockets 103a and 103b. To combine the centers of mass 112, 112a and 112b into a single gauging curve 113, this gauging curve 113 will fork at point 117 and will pass through transition points 118a, 118b mid-way between said point 117 and the highest centers of mass 112a, 112b in each of the pockets 103a, 103b, as illustrated.

The two starting points 114a, 114b of the gauging curve 113 are determined in the same manner as in the preceding embodiment, and the same smoothing can also be carried out on the two initial sections of the gauging curve 113.

Figure 10:
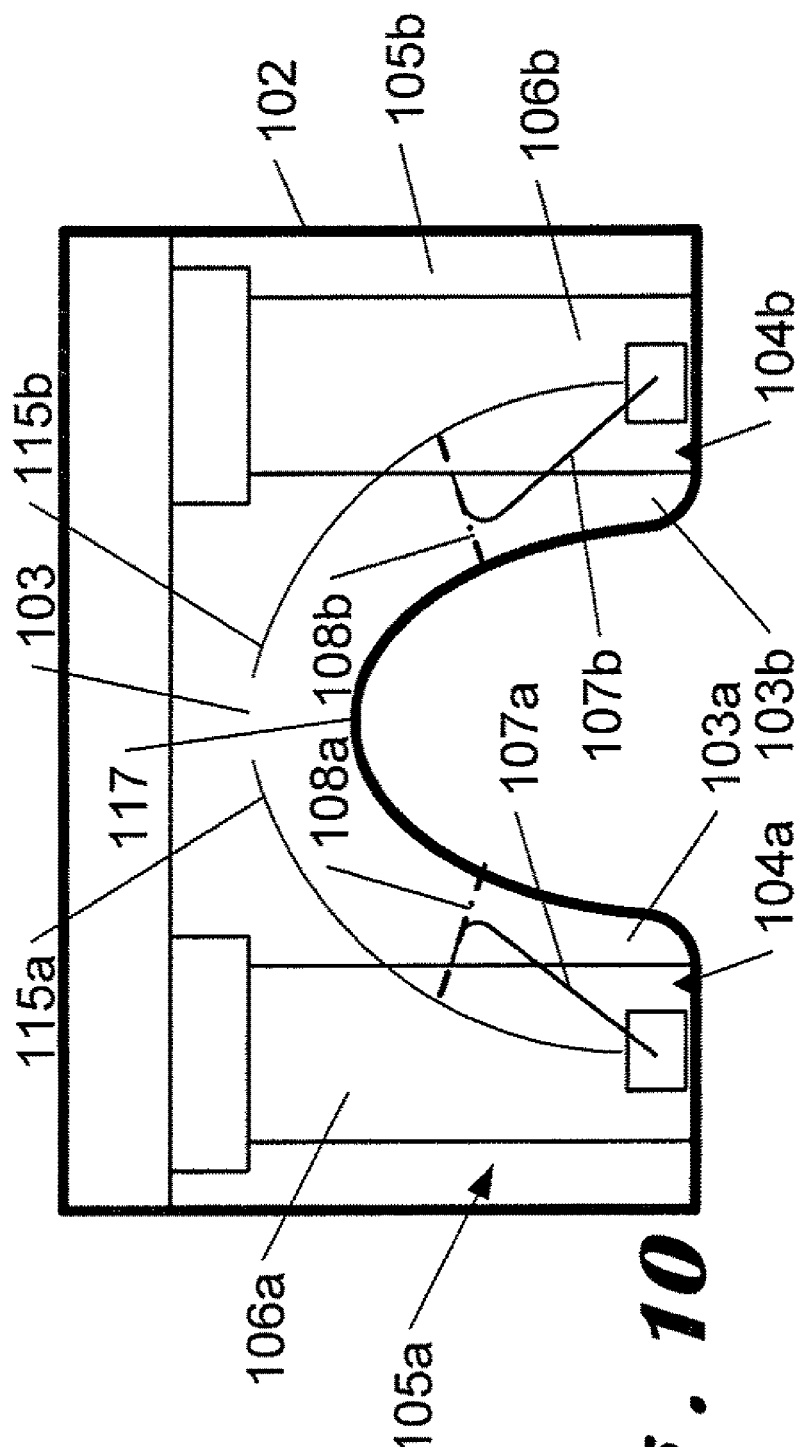
FIG. 10 illustrates the "practical" gauging curve derived from the model.
Figure 11:
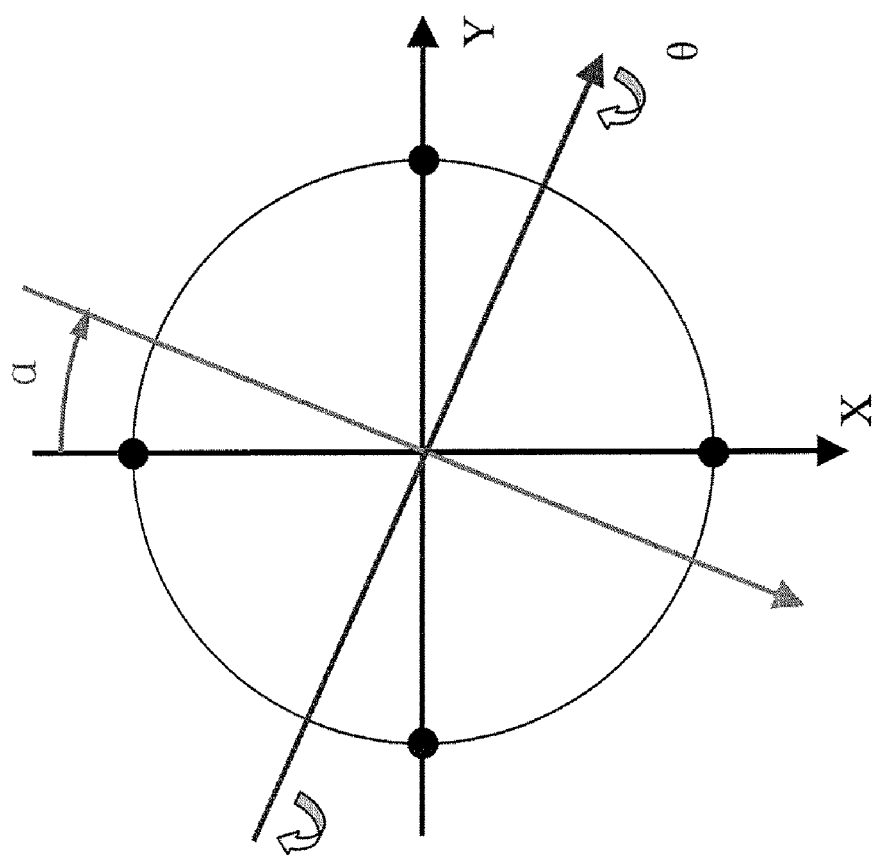

Finally, the actual gauging curve 113 (which is illustrated in FIG. 10) is approximated in the same manner by two arcs 115a, 115b centered on axes 108a, 108b so as to determine parameters for the location, shape and orientation of the gauges 107a, 107b, especially the positions and orientations of the axes 108a, 108b and the positions and lengths of the float arms 116a, 116b relative to their respective axes 108a, 108b. These gauges 107a, 107b may then be calibrated and validated following the same steps described for the first embodiment of the simulation method of the invention.

Although the present invention has been described with reference to one specific exemplary embodiment, it is obvious that various modifications and changes can be carried out on these examples without departing from the general scope of the invention as defined by the claims. Consequently, the description and the drawings should be considered in an illustrative rather than restrictive sense.

In the invention, the aforementioned calculations and the development of the curves may be carried out manually, on the basis of experimental results obtained on a tank prototype. However, advantageously, these operations are carried out by software for which the input data are the characteristics of the tank (geometry, for example broken down into mesh form) and of the gauge (geometry and location in the tank).

The present invention furthermore aims also to cover such software and also any electronic medium or data processing device incorporating such software.

The invention claimed is:

1. A method for generating a gauging curve for a hollow body configured to contain a liquid, said curve including a set of measurement points for a liquid level inside the hollow body, said curve approaching an optimum gauging curve, said method comprising:

for several different partial filling volumes of said hollow body, calculating an average center of mass of a corresponding free liquid surface for various inclinations of the hollow body, in terms of both amplitude and direction; and generating a gauging curve that passes substantially through each of said average centers of mass, in which the hollow body is a fuel tank comprising a fuel extraction pump comprising an extraction point and in which the gauging curve includes a starting point close to or coincident with this extraction point.

2. The method according to claim 1, further comprising smoothing the gauging curve over an initial section comprising the starting point and a point of the average centers of mass that is closest thereto.

3. The method according to claim 1, in which the hollow body comprises a gauge that is in the form of a float arm pivotably attached to a pump/gauge module about an axis that passes through said module, said method further comprising approximating a real gauging curve by at least one arc centered on this axis.

4. The method according to claim 1, further comprising:

selecting a gauge with given location, shape and orientation;

calculating a calibration curve for a coupling of the gauge and the hollow body;

simulating a deformation of the hollow body on a virtual model thereof for at least one ageing period;

calculating a gauging error associated with this ageing period; and verifying that said calculated gauging error does not exceed a predetermined maximum gauging error.

5. A method of manufacturing a liquid tank comprising a gauge, in particular a liquid fuel tank for a vehicle, based on a virtual model of the tank, wherein parameters for a location, shape and orientation of the gauge are determined by the method according to claim 1.

6. The method according to claim 5, using a software for which input data include a tank geometry and a gauge geometry and location.

7. A nontransitory electronic medium incorporating the software to execute the method according to claim 6.

8. A data processing device executing the software to execute the method according to claim 6.

9. A method for generating a gauging curve for a hollow body configured to contain a liquid, said curve including a set of measurement points for a liquid level inside the hollow body, said curve approaching an optimum gauging curve, said method comprising:

for several different partial filling volumes of said hollow body, calculating an average center of mass of a corresponding free liquid surface for various inclinations of the hollow body, in terms of both amplitude and direction;

generating a gauging curve that passes substantially through each of said average centers of mass;

selecting a gauge with given location, shape and orientation;

calculating a calibration curve for a coupling of the gauge and the hollow body;

simulating a deformation of the hollow body on a virtual model thereof for at least one ageing period;

calculating a gauging error associated with this ageing period; and verifying that said calculated gauging error does not exceed a predetermined maximum gauging error.

\* \* \* \* \*

UNITED STATES PATENT AND TRADEMARK OFFICE
CERTIFICATE OF CORRECTION

| | |
|---|---|
| PATENT NO. | : 8,175,856 B2 |
| APPLICATION NO. | : 12/490497 |
| DATED | : May 8, 2012 |
| INVENTOR(S) | : Eric Volto et al. |

It is certified that error appears in the above-identified patent and that said Letters Patent is hereby corrected as shown below:

Front page, Inventors: "Francçois Francini" should read -- François Francini --

Signed and Sealed this
Twenty-fourth Day of July, 2012

David J. Kappos
*Director of the United States Patent and Trademark Office*